United States Patent [19]

Jacobs

[11] Patent Number: 5,545,074
[45] Date of Patent: Aug. 13, 1996

[54] ABRASIVE BLASTING SYSTEM WITH WASTE WATER RECYCLING

[76] Inventor: Patrick T. Jacobs, 27304 - 227th Pl. SE., Maple Valley, Wash. 98038

[21] Appl. No.: 365,306

[22] Filed: Dec. 28, 1994

[51] Int. Cl.[6] ............... B24C 3/06; B24C 5/04; B24C 7/00; B24C 9/00
[52] U.S. Cl. .................. 451/40; 451/60; 451/87; 451/99; 451/102
[58] Field of Search .................. 210/767, 800, 210/805, 197; 451/36, 38, 39, 40, 60, 87, 88, 92, 96, 99, 102, 446, 447

[56] References Cited

U.S. PATENT DOCUMENTS

| | | |
|---|---|---|
| 2,597,434 | 5/1952 | Bishop et al. . |
| 3,237,351 | 3/1966 | Millhiser ............. 451/40 |
| 3,455,062 | 7/1969 | Eppler ................. 451/8 |
| 3,553,895 | 1/1971 | Power ................. 451/87 |
| 4,232,487 | 11/1980 | Brown . |
| 4,319,435 | 3/1982 | Suzuki et al. ........ 451/88 X |
| 4,330,968 | 5/1982 | Kibayashi et al. ... 451/88 |
| 4,333,277 | 6/1982 | Tasedan . |
| 4,630,410 | 12/1986 | Cavada et al. ....... 451/88 X |
| 4,872,293 | 10/1989 | Yasukawa et al. ... 451/87 X |
| 4,872,975 | 10/1989 | Benson ............... 451/87 X |
| 4,984,396 | 1/1991 | Urakami .............. 451/87 |
| 4,984,397 | 1/1991 | Van Leeuwen . |
| 5,049,260 | 9/1991 | Spears . |
| 5,107,630 | 4/1992 | Lodewijk ............. 451/88 |
| 5,123,206 | 6/1992 | Woodson . |
| 5,195,276 | 3/1993 | Vennerholm ......... 451/88 X |
| 5,319,893 | 6/1994 | Hockett . |

Primary Examiner—Timothy V. Eley
Attorney, Agent, or Firm—Steven P. Koda

[57] ABSTRACT

A closed-environment wet-abrasive blasting system includes a vacuum device for recovering a waste stream of water, abrasive particulate and surface debris. The waste stream is filtered resulting in cleaned water recycling through the system. During operation, water is pumped from a water holding tank to a blast head. Also, abrasive particulate is forced from canister to the blast head. The abrasive material and water form a blast stream which impacts on a surface to treat the surface. The blast head is held to the surface during use by the suction force and defines a work volume over the surface under treatment. In effect, the blast head defines a closed environment in which abrasive particulate water and surface debris do not escape into the surrounding environment, but instead is captured. The vacuum force pulls the surface debris, abrasive particulate and water (i.e., waste stream) from the blast head along a vacuum hose into a recovery tank. There the waste stream accumulates while air passes on to the vacuum. As the waste accumulates, the level rises to a filter. The filter passes air and water, and substantially filters out the abrasive material and surface debris leaving the abrasive particulate and surface debris in the recovery tank. The water and air pass into the water holding tank. The air is pulled into the water recovery tank through a screen that breaks air bubbles up into smaller air bubbles.

10 Claims, 2 Drawing Sheets

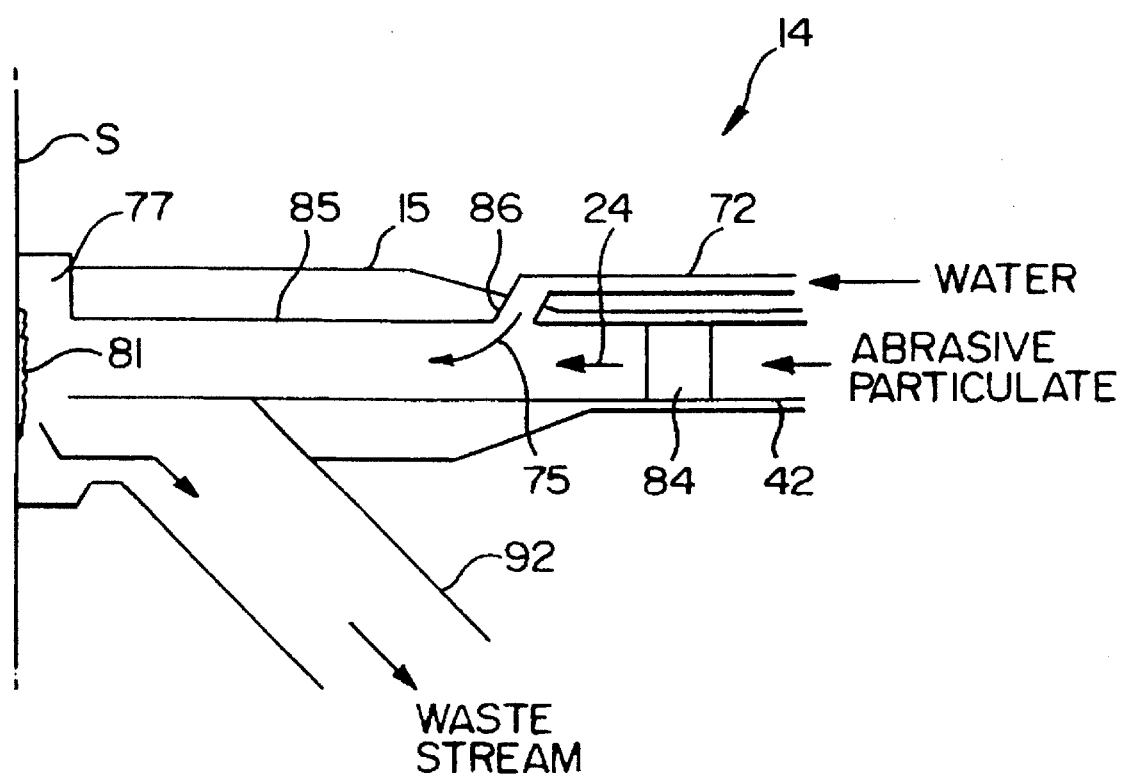

ABRASIVE BLASTING SYSTEM WITH WASTE WATER RECYCLING

BACKGROUND OF THE INVENTION

This invention relates to an abrasive-blasting method and apparatus for treating a surface. More particularly this invention relates to a closed-environment wet-abrasive blasting system for ejecting abrasive particulate in a water stream through a nozzle area onto a surface to remove surface debris. The water, abrasive particulate and surface debris are vacuumed at the nozzle area, then filtered. Filtered water is recycled through the system.

Abrasive blasting systems eject an abrasive blast stream onto a surface for deburring, abrading, smoothing or removing surface material. Abrasive particulate such as sand, sodium bicarbonate, walnut shells, plastic or other matter are ejected under pressure to impact the surface. The force of impact abrades or cleans the surface removing, coating, contaminants, corrosion or the like (i.e., surface debris). In many applications the abrasive particulate and surface debris are dispersed into the surrounding environment creating a hazardous breathing and work environment. The dispersal of dust into the air is particularly undesirable in indoor or "closed" environments. Plastics and walnut shells for example are used in such applications because less dust is created. It also is known to use a vacuum device to capture the abrasive particulate and surface debris at the nozzle area so that the matter does not escape into the surrounding environment. U.S. Pat. No. 5,319,893 (Hockett) discloses a "Recovery System." U.S. Pat. No. 4,333,277 (Tasedan) discloses a "Combination Sand-Blasting and Vacuum Apparatus".

Wet blasting systems eject the abrasive particulate in a stream of water under pressure. The water stream keeps the dust down, and thus, keeps the ambient air cleaner. U.S. Pat. No. 5,123,206 (Woodson) discloses a "Wet Abrasive Method." Wet blasting systems, however, conventionally release water into the surrounding environment making indoor wet blasting undesirable. Accordingly, there is a need for a wet blasting system which contains the abrasive stream from contaminating the surrounding environment. U.S. Pat. No. 5,049,260 (Spears) disclose a hopper in the blast area into which a waste stream falls. A separation system recycles a wet slurry of blast media. A shortcoming of the hopper is that it is open to the environment and relies on gravity to collect the waste stream. Thus, it is undesirable for indoor use and less applicable for horizontal surfaces.

In addition to avoiding pollution and improving the workplace environment, it also is desirable to recover waste material for re-use. It is known to recover abrasive material from the captured waste stream. U.S. Pat. No. 4,984,397 (Van Leeuwen) discloses an abrasive (dry) blasting system for separating grit and dust through progressive baffling which feeds the grit back into a supply tank for re-use. Spears above includes baffles for separating out large particles, so that small particles and waste water are recycled in a slurry blast system. In many applications, however, it is desirable to substantially filter out the solid particulate from the waste water. Accordingly, there is a need for a closed-environment wet blasting system which recovers and filters the waste water.

SUMMARY OF THE INVENTION

According to the invention, a closed-environment wet-abrasive blasting system includes a vacuum device for recovering a waste stream of water, abrasive particulate and surface debris. The waste stream is filtered resulting in cleaned water recycling through the system.

According to one aspect of the invention, a blast head is held to a surface under treatment. A blast stream of abrasive particulate and water impact onto a surface area causing removal of surface material, corrosion and contaminants (i.e., surface debris). A vacuum applies a suction force at the blast head via a vacuum hose for capturing the abrasive particulate, water and surface debris as a waste stream. The waste stream is pulled into a recovery tank.

According to another aspect of the invention, the recovery tank includes a filtering device which passes the waste water and blocks the abrasive particulate and surface debris. The filtered water passes from the recovery tank to a water holding tank, which serves as a water supply for the blasting operation. The waste stream enters the recovery tank at or toward the tank's top. The filter is positioned toward the top of the recovery tank, but away from the waste stream inlet. Much of the waste stream falls before reaching the filter causing an accumulation of waste (i.e., water, abrasive particulate, surface debris) in the recovery tank. Air is pulled to and through the filter. When the waste accumulates to the filter height, water passes through the filter into the water holding tank.

According to another aspect of the invention, the vacuum device is coupled to the abrasive system at the water holding tank. The suction force pulls air through the water holding tank from the water recovery tank. The suction force also pulls the waste stream from the blast head into the recovery tank and pulls the abrasive particulate from the particulate canister to the blast head. In one embodiment the air pulled from the water recovery tank enters the water holding tank through a pipe. The air is pulled from the pipe through the water in the water holding tank out a vacuum outlet. In one embodiment a displacement screen is positioned at the pipe within the water holding tank to break up the air so it moves in smaller bubbles through the water.

An advantage of this invention is that a wet blast stream can be used in an indoor or other closed environment without detrimental environmental impact. Another advantage of this invention is that water is captured from a waste stream, then filtered and re-used. Thus, water resources are conserved and contaminated water is not released to the environment. Another advantage is that dust within a water holding tank and water-pump lines is minimal.

These and other aspects and advantages of the invention will be better understood by reference to the following detailed description taken in conjunction with the accompanying drawings.

BRIEF DESCRIPTION OF THE DRAWINGS

FIG. 2 is a cutaway view of the blast head of FIG. 1.

DESCRIPTION OF SPECIFIC EMBODIMENTS

Overview

Figure 1:
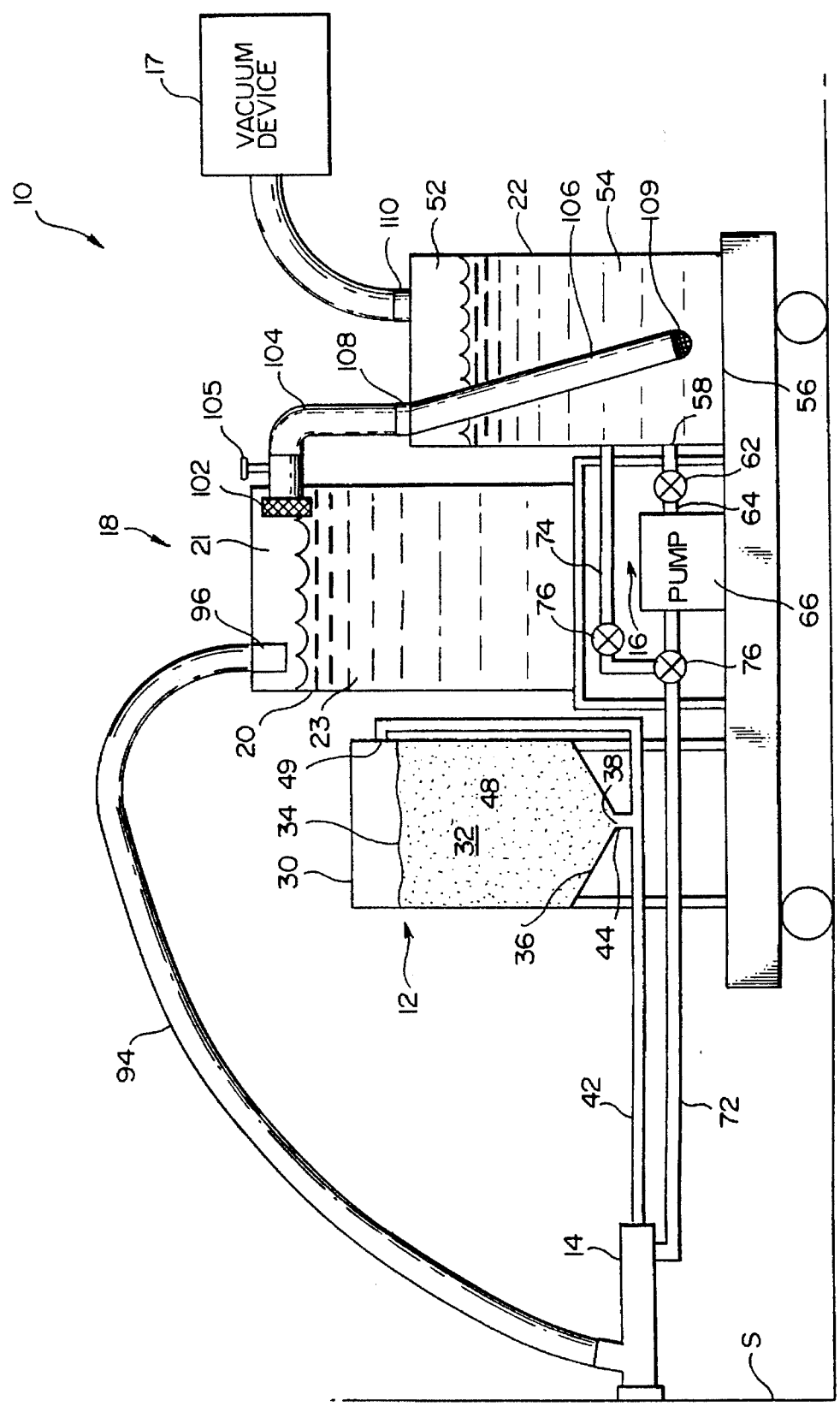
FIG. 1 is a schematic diagram of the closed-environment wet-abrasive blasting system according to an embodiment of this invention.

FIG. 1 shows a schematic diagram of the wet abrasive blasting system 10 for closed environment blasting according to a specific embodiment of this invention. The blasting system 10 ejects a wet stream of abrasive particulate onto a surface S for treating the surface. An abrasive blasting subsystem 12 feeds a pressurized stream of abrasive particulate to a blast head 14. A water ejection subsystem 16 feeds a pressurized stream of water to the blast head 14. The abrasive and water streams define a blast stream which impacts the surface S removing surface coatings, corrosion, contaminants and other materials (i.e., surface debris).

A vacuum device 17 creates a suction force for capturing abrasive particulate, water and surface debris at the blast head 14. The captured media form a waste stream pulled into a recovery tank 20. A waste recovery subsystem 18 accumulates the waste. When the waste accumulates to a filter height, water runs into a water holding tank 22 of the water ejection system 16. The recycled water then is available for re-use in a blast stream. The vacuum generator 17 is coupled to the water holding tank 22 pulling the waste stream into the recovery tank 20 and holding tank 22.

Abrasive Blasting Subsystem

The abrasive blasting subsystem 12 includes a pressurized canister 30 having an internal reservoir 32 for abrasive particulate 34. Exemplary particulate are sodium bicarbonate or sand, although other blast media (e.g., walnut shells, plastic pellets) may be used. The bottom wall 36 is hopper-shaped to funnel abrasive particulate 34 downward toward an outlet 38 at the bottom center of the canister 30. In addition the canister 30 includes a pressure relief valve (not shown) or other pneumatic control devices as would be appreciated by one of ordinary skill in the art of abrasive blasting systems.

Outlet 38 is connected to a generally horizontally oriented tube 42 by way of an elbow fitting 44. Alternatively the elbow fitting 44 is an integral part of the canister 30. In one embodiment the outlet 38 and tube 42 have inner diameters of approximately 1.0 inches. The tube 42 leads to a blast head 14. A pressurized line 48 is tapped off tube 42 leading back to the upper portion of the canister 30. The pressurized line 48 is coupled to the canister 30 at an inlet 49. By tapping off tube 42, a uniform pressure is maintained between the canister 30, tube 42 and line 48. In one embodiment line pressure moves approximately 300 cubic feet per minute ("cfm") of particulate 34. The abrasive particulate 34 moves under pressure from the outlet 44 along line 42 into the blast head 14.

Water Ejection Subsystem

The water ejection subsystem 16 includes a tank 22 defining an internal reservoir 52 for holding water 54. In one embodiment the tank 52 holds 55 gallons. Toward the base 56 of the water holding tank 22 is an outlet 58 and pressure control valve 62. A tube 64 couples the outlet 58 and control valve 62 to a pump 66. The pump 66 pumps water from the tank 22 through another tube 72 to the blasting head 14. In one embodiment the pump 66 is an air-driven centrifugal pump, an air-driven diaphragm pump, or electric pump pumping 0–10 gallons of water per minute ("gpm") to the blast head 14.

A return line 74 and pneumatic valves 76 are coupled to the tube 72 for feeding water back into the tank 22 when the pump 66 is on, but blasting is not in process. Instead of ejecting the water at the blast head 14, the water is fed back through the return line 74 into the water holding tank 22.

In one embodiment tubes 64, 72, and 74 each have an inner diameter of 1 inch.

Blast Head

Referring to FIGS. 1 and 2, the blast head 14 receives (i) a particulate 34 stream under pressure from the particulate canister 30 via tube 42, and (ii) a water stream 75 under pressure from the water holding tank 22 via tube 72. In one embodiment the blast head 14 has a long venturi and wheels. In another embodiment, the blast head 14 has a long venturi without wheels. In yet another embodiment, the blast head 14 has a short venturi without wheels. The blast head 14 defines a work volume 77. When the blast head 14 is held to a surface S, the work volume 77 is enclosed between the surface S and the blast head housing 15. In one embodiment, the work volume spans a surface area of approximately 15–21 inches by 4–10 inches and has a depth of approximately 4–6 inches. The covered work surface and blast head volume vary among different embodiments.

Abrasive particulate from tube 42 exits nozzle 84 and moves along a tube 85 toward a surface S under treatment. Water under pressure from tube 72 is fed into the particulate stream at opening 86 along tube 85. The abrasive particulate and water within tube 85 define a blast stream for impacting onto the surface S. In one embodiment nozzle 84 and opening 86 each have a ¼ inch diameter and define a blast pattern at the surface having an approximately 2–3 inch diameter. The abrasive particles and water impact onto the surface S removing surface debris 81.

An inlet 92 is formed on the blast head 14 for coupling a vacuum hose 94 to the blast head 14. Water 75, abrasive particulate 34 and surface debris 81 are pulled into inlet 92 after impacting surface S defining a waste stream. The waste stream is pulled through the vacuum hose 94 into the waste recovery tank 20. In one embodiment the vacuum hose 94 has an inner diameter of approximately 3 inches.

Waste Recovery Subsystem

The waste recovery system 18 includes a recovery tank 20 and a filter 102. The recovery tank 20 defines an internal chamber 21 for holding captured waste (e.g., water, abrasive particulate and surface debris). In one embodiment the recovery tank is a 55 gallon tank. The filter 102 allows air and water, while blocking the abrasive particulate 34 and surface debris. The filter 102 is a membrane, filter module or other filtering device. In various embodiments the filter 102 has a filtration size of 10 to 150 microns. The specific size depends on the abrasive particulate size and surface material under treatment.

The waste stream enters the recovery tank 20 at inlet 96 from blast head 14 via vacuum hose 94. In one embodiment, the inlet 96 is at the top of the tank 20. The filter 102 also is positioned near the top but at an opposite side of the tank 20. The vacuum 17 generates a suction force pulling air through the filter 102. The waste stream travels through the recovery tank 20 toward the filter 102. As it travels, however, much of the waste stream falls into the tank 20. As the waste stream fills the recovery tank 20, the waste level approaches a height of the filter 102. When the waste level gets to the filter height, water passes through the filter 102 running off into the water recovery tank 22. The filter size is selected to prevent substantially all abrasive particulate 34 and surface debris from exiting the recovery tank 20. In one embodiment, the filter 102 position is higher than the maximum water level in the water holding tank 22, so filtered water flows under gravity forces into the holding tank 22. Air pressure from the vacuum 17 also pulls the water into the holding tank 22.

A flexible hose 104 defines a path between the recovery filter 102 and the holding tank 22. In addition a valve 105 is positioned at the connection between the water recovery tank 20 and the hose 104. The valve 105 serves to close off the water recovery tank 20 so no spillage occurs when the hose 104 is removed.

A pipe 106 at the water holding tank 22 is connected to the hose 104 for receiving the air under pressure and the filtered water. The pipe 106 extends from a first surface 108 coupled to the hose 104 to a distal end toward the base 56 of the holding tank 22. A screen 109 is attached to the distal end of the pipe 106 for displacing air as it is sucked through the water holding tank 22. The screen 109 serves to break up the pipe diameter-sized air bubbles pulled through the pipe 106. As a result, smaller bubbles are pulled through the water in the water holding tank to exit via outlet 110.

The vacuum generator 17 is coupled to the water holding tank 22 at the outlet 110. In one embodiment, the vacuum generator creates a force of 375 cfm air pulling abrasive particulate, water and surface debris from blast head 14. In one embodiment a vacuum fan is coupled to the outlet 110 pulling air through the system 10 into the water holding tank 22 and through the water holding tank 22. The vacuum fan also pulls the waste stream from the blast head 14 into the recovery tank 20.

Operation

During operation, water is pumped from water holding tank 22 by pump 66 along tube 72 to the blast head at a pressure of 0 to 10 gpm. Also, abrasive particulate 34 is forced from pressurized cannister 30 along tube 42 to the blast head at a pressure of approximately 300 cfm. The abrasive material 34 and water form a blast stream which impacts on a surface to treat the surface. Under various application the surface is smoothed, removed, or cleaned resulting in loosened surface debris. The blast head 14 is held to the surface during use by the suction force and defines a work volume over the surface under treatment. In effect, the blast head defines a closed environment in which abrasive particulate water and surface debris do not escape into the surrounding environment, but instead is captured. The vacuum force pulls the surface debris, abrasive particulate and water (i.e., waste stream) from the blast head 14 along a vacuum hose 94 into a recovery tank 20. There the waste stream accumulates while air passes on to the vacuum. As the waste accumulates, the level rises to the filter 102. The filter 102 passes air and water, and substantially filters out the abrasive material and surface debris leaving the abrasive particulate and surface debris in the recovery tank 20. The water and air pass into the water recovery tank. The air is pulled through a screen 109 displacing the air into smaller bubbles, and in effect, creating a vacuum bath for the air.

Meritorious and Advantageous Effects

An advantage of this invention is that a wet blast stream can be used in an indoor or other closed environment without detrimental environmental impact. Another advantage of this invention is that water is captured from a waste stream, then filtered and re-used. Thus, water resources are conserved and contaminated water is not released to the environment.

Although a preferred embodiment of the invention has been illustrated and described, various alternatives, modifications and equivalents may be used. For example, although a specific embodiment with tank sizes, line diameters, pressures, flow rates and blast dimensions are given such values may vary for other embodiments of this invention. Therefore, the foregoing description should not be taken as limiting the scope of the inventions which are defined by the appended claims.

What is claimed is:

1. A method for recovering and re-using water in a wet abrasive blasting system, the system comprising:

a pressurized canister for holding abrasive particulate;

a water holding tank;

a blast head for receiving abrasive particulate under pressure from the pressurized cannister and water under pressure from the water holding tank, the blast head defining a work volume into which abrasive particulate and water are ejected;

a waste recovery tank for receiving a waste stream of water, abrasive particulate, and surface debris from the blast head;

filter means at the waste recovery tank for filtering the waste stream to pass water from the waste recovery tank into the water holding tank; and means generating a vacuuming force for pulling water, abrasive particulate and surface debris from the blast head into the waste recovery tank;

the method comprising the steps of:

forcing abrasive particulate from the pressurized canister into the blast head with the vacuum generating means;

pumping water from the water holding tank into the blast head, the ejected water and forced abrasive particulate defining a blast stream impacting onto a surface to create surface debris;

sucking the water, abrasive particulate and surface debris from the blast head into the waste recovery tank under the vacuuming force generated by the vacuum force generating means;

accumulating water, abrasive particulate and surface debris in the waste recovery tank to a level at which the water flows to the filter; and passing water through the filter into the water holding tank.

2. The method of claim 1, further comprising the step of:

pulling air from the waste recovery tank through the filter into and through water in the water holding tank and out of the water holding tank.

3. The method of claim 2, in which the pulled air passes through a screen in the water holding tank for breaking air bubbles up into smaller air bubbles.

4. The method of claim 1, in which the blast head is held to a surface under treatment to define a work volume as a closed environment workspace preventing abrasive particulate and surface debris from escaping into a surrounding external environment.

5. The method of claim 1, in which the waste recovery tank is positioned at a higher elevation than the water holding tank; in which water, abrasive particulate and surface debris accumulate in the recovery tank toward a height at which the filter means is positioned; and in which water flows under gravitational force from the recovery tank through the filter means into the water holding tank when the height is reached.

6. A wet abrasive blasting system which recovers and re-uses water, comprising:

a pressurized canister for holding abrasive particulate;

a water holding tank;

a blast head for receiving abrasive particulate under pressure from the pressurized canister and water under pressure from the water holding tank, the blast head defining a work volume into which abrasive particulate and water are ejected;

a waste recovery tank for receiving a waste stream of water, abrasive particulate, and surface debris from the blast head;

filter means at the waste recovery tank for filtering the waste stream to pass water from the waste recovery tank into the water holding tank;

means generating a vacuuming force for pulling water, abrasive particulate and surface debris from the blast head into the waste recovery tank.

7. The system of claim 6, in which the generating means also is for pulling air from the waste recovery tank through the filter means into and through the water in the water holding tank and out of the water holding tank.

8. The system of claim 7, further comprising a screen at the water holding tank through which filtered water and the pulled air passes.

9. The system of claim 6 in which the blast head is held to a surface under treatment to define the work volume as a closed environment workspace preventing abrasive particulate and surface debris from escaping into a surrounding external environment.

10. The system of claim 6, in which the waste recovery tank is positioned at a higher elevation than the water holding tank; in which water, abrasive particulate and surface debris accumulate in the recovery tank toward a height at which the filter means is positioned; and in which water flows under gravitational force from the recovery tank through the filter means into the water holding tank when the height is reached.

* * * * *